Figure 1:
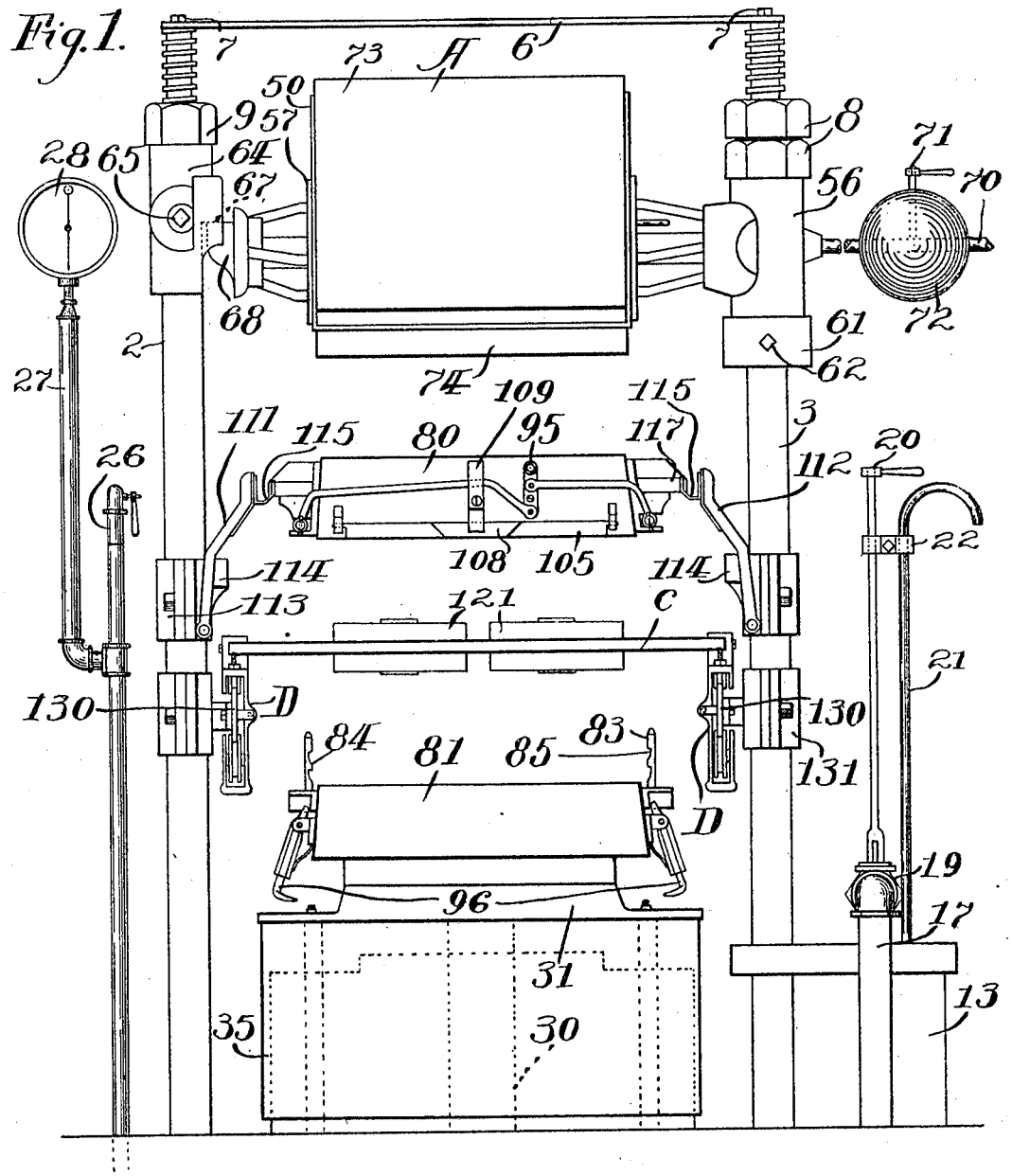

J. ALLENSON.
MOLDING MACHINE.
APPLICATION FILED JUNE 8, 1909.

955,838.

Patented Apr. 19, 1910.
13 SHEETS—SHEET 2.

Witnesses
Jule Donovan.
F. H. Bradbury

Inventor
John Allenson,
by: F. H. Bradbury
Attorney.

J. ALLENSON.
MOLDING MACHINE.
APPLICATION FILED JUNE 8, 1909.

955,838.

Patented Apr. 19, 1910.
13 SHEETS—SHEET 3.

Fig. 3.

Witnesses:
Jule Donovan
L. H. Bradbury

Inventor:
John Allenson,
by: J. G. Bradbury
Attorney.

J. ALLENSON.
MOLDING MACHINE.
APPLICATION FILED JUNE 8, 1909.

955,838.

Patented Apr. 19, 1910.
13 SHEETS—SHEET 6.

Witnesses:
Jule Donovan.
L. H. Bradbury

Inventor:
John Allenson,
by: F. H. Bradbury
Attorney.

J. ALLENSON.
MOLDING MACHINE.
APPLICATION FILED JUNE 8, 1909.

955,838.

Patented Apr. 19, 1910.
13 SHEETS—SHEET 8.

Witnesses:
Jule Donovan.
O. H. Bradbury

Inventor:
John Allenson,
by: J. S. Bradbury
Attorney

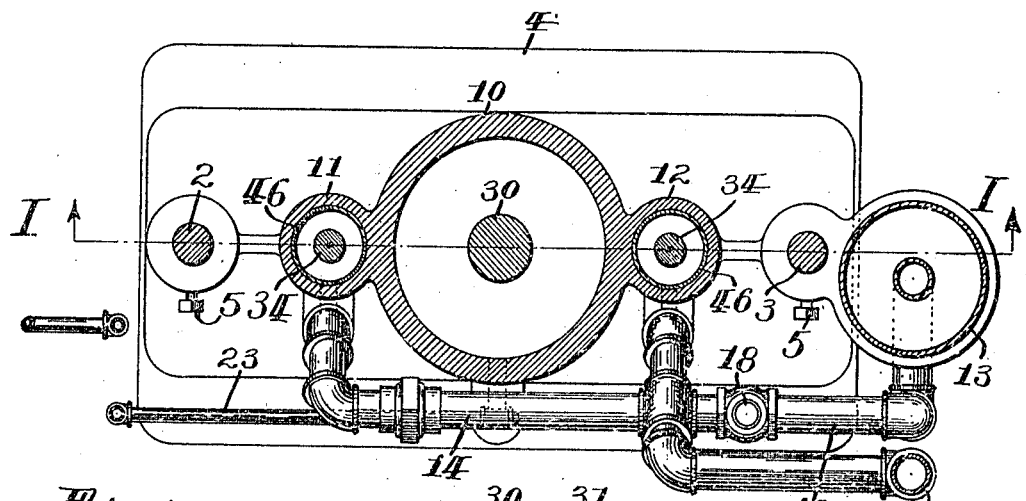

J. ALLENSON.
MOLDING MACHINE.
APPLICATION FILED JUNE 8, 1909.

955,838.

Patented Apr. 19, 1910.
13 SHEETS—SHEET 10.

Witnesses:
Jule Donovan.
O. H. Bradbury.

Inventor:
John Allenson,
by: J. Bradbury
Attorney

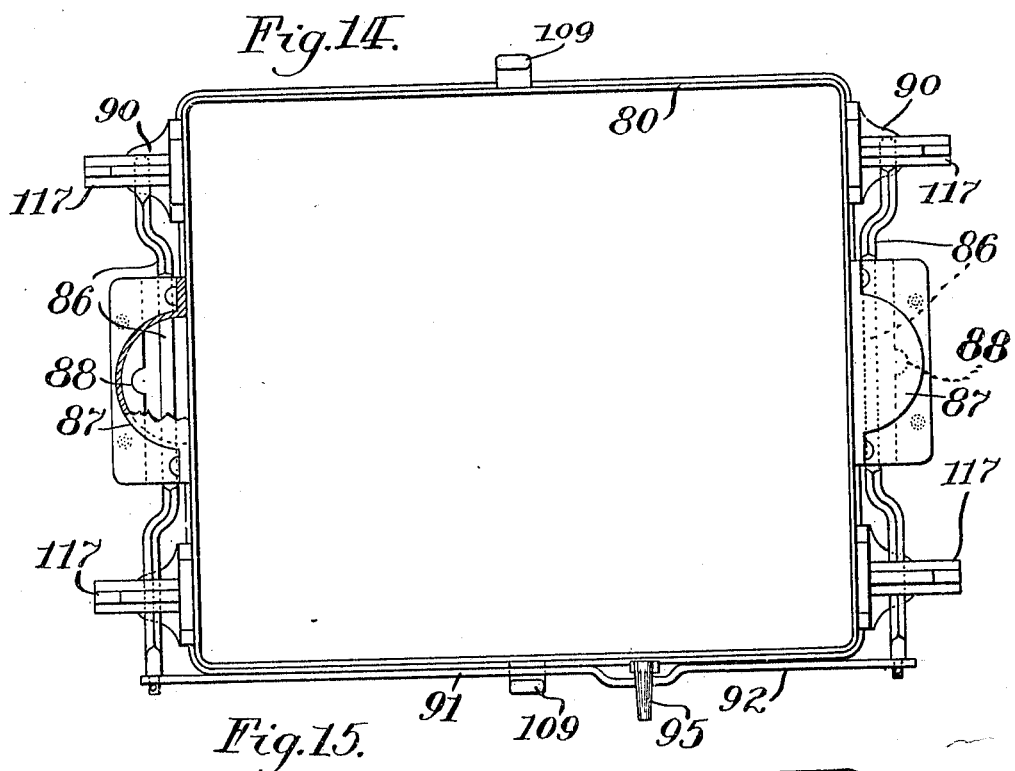
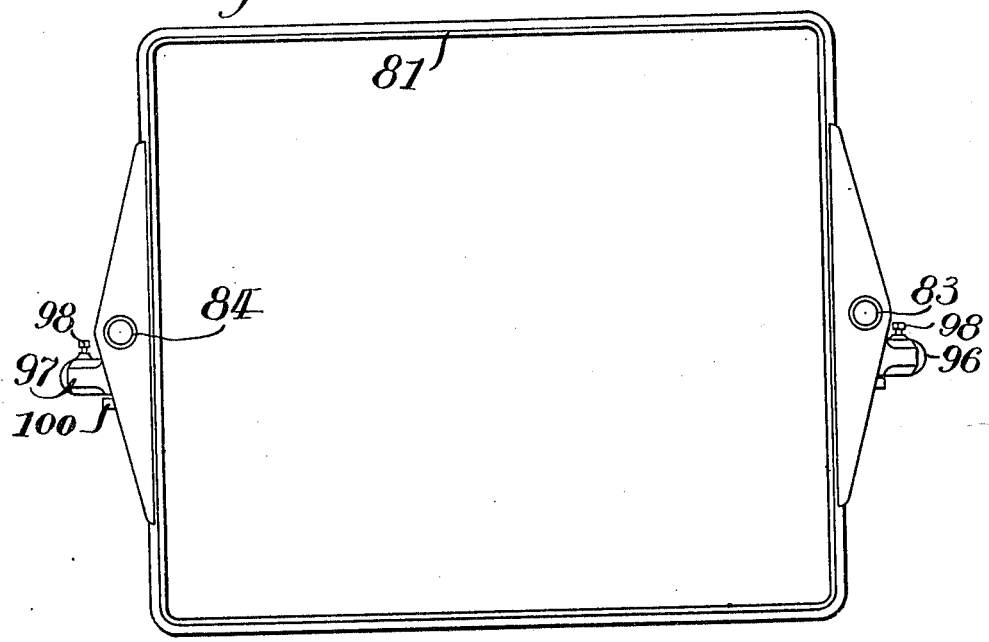

J. ALLENSON.
MOLDING MACHINE.
APPLICATION FILED JUNE 8, 1909.
955,838.
Patented Apr. 19, 1910.
13 SHEETS—SHEET 12.
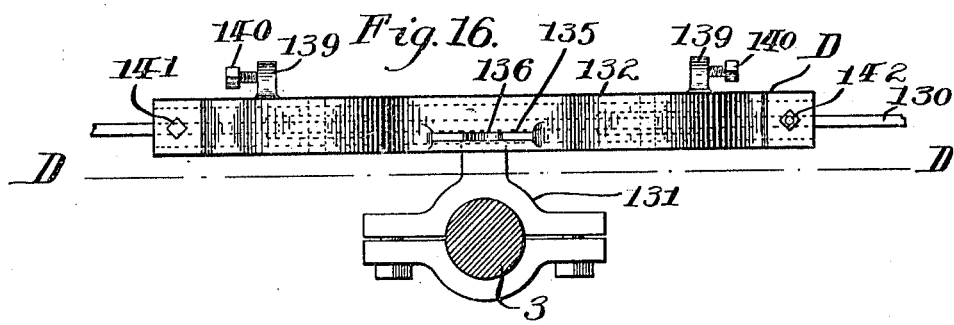
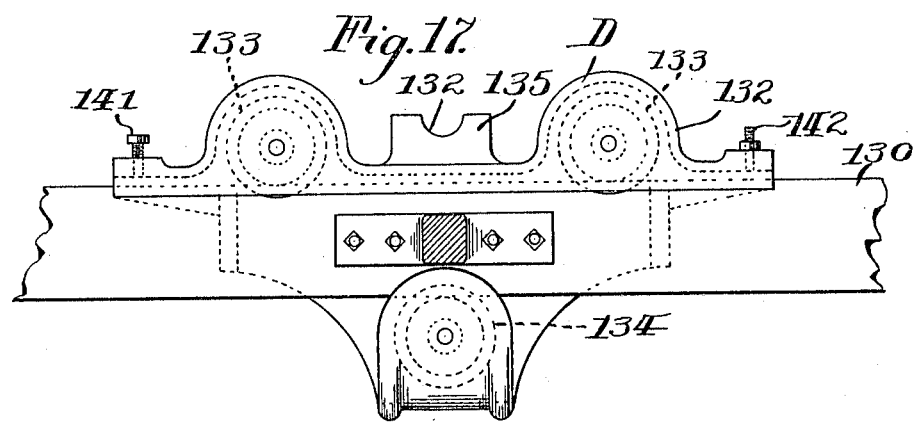
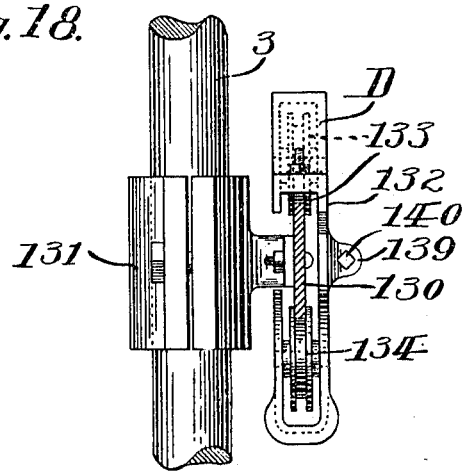
Witnesses:
Jule Donovan.
L. H. Bradbury
Inventor:
John Allenson,
by: J. G. Bradbury
Attorney

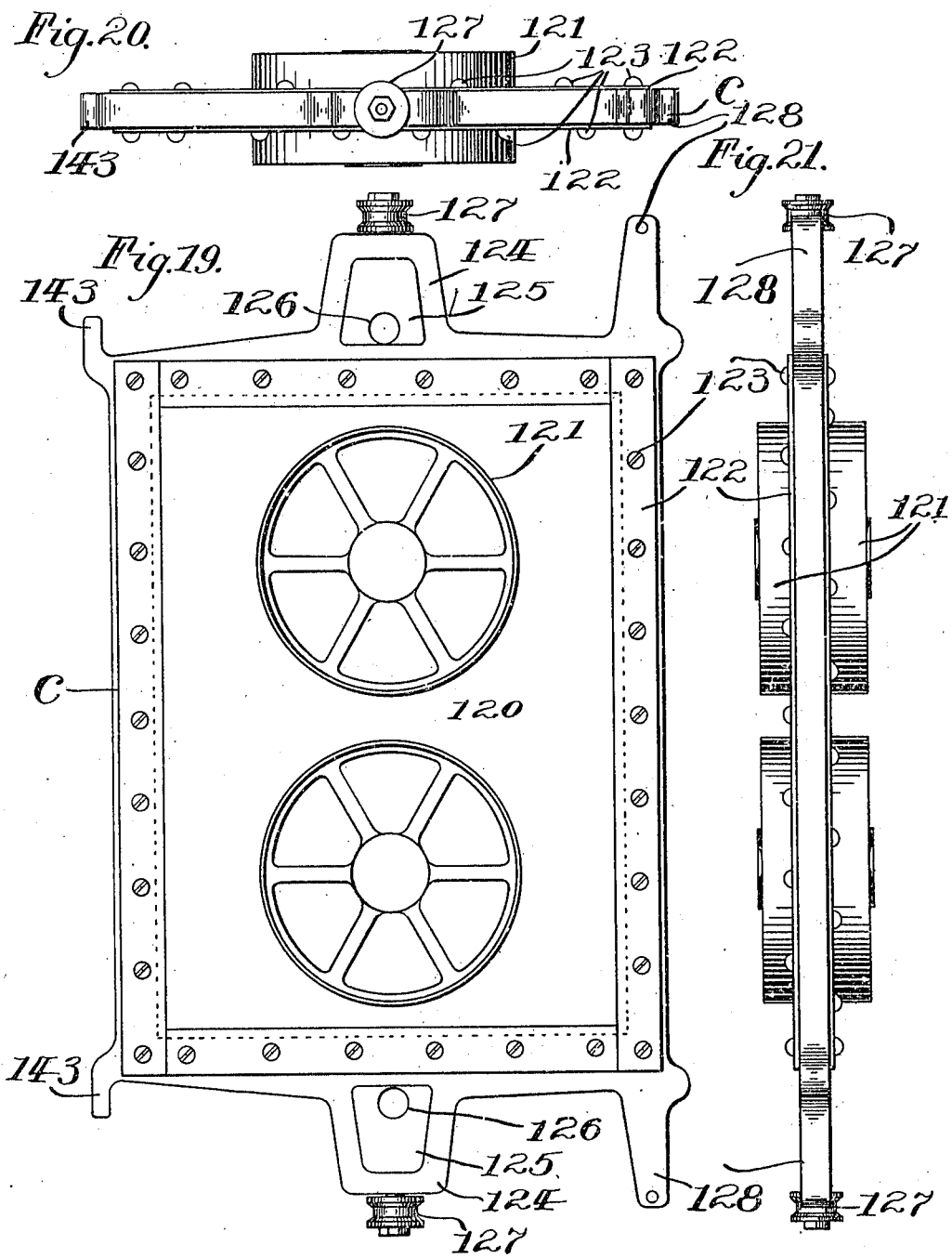

UNITED STATES PATENT OFFICE.

JOHN ALLENSON, OF ST. PAUL, MINNESOTA, ASSIGNOR TO ST. PAUL FOUNDRY COMPANY, A CORPORATION OF MINNESOTA.

MOLDING-MACHINE.

955,838.     Specification of Letters Patent.     Patented Apr. 19, 1910.

Application filed June 8, 1909. Serial No. 500,846.

*To all whom it may concern:*

Be it known that I, JOHN ALLENSON, a citizen of the United States, residing at St. Paul, in the county of Ramsey and State of Minnesota, have invented a new and useful Improvement in Molding - Machines, of which the following is a specification.

My invention relates to improvements in molding machines and more particularly to that class which is used for molding metal in flasks.

The primary object of my invention is to produce a mold in the flask in a more efficient and effective manner by less hand labor than heretofore.

With my invention a fewer number of operations are required than with prior devices and all of these operations for producing a perfect mold may be familiarized by any one in a few hours.

With my invention compressed air is used for compressing the sand in the cope and drag of the flask and a gage is employed so that the operator can readily determine how much pressure is applied. This enables the production of any number of molds having the sand uniformly pressed, which obviously, to one skilled in the art, is an advantage. The parts of the machine also are so constructed that oil on the shafts is not necessary where they are exposed to the sand thus saving wear of the machine. The parts of the compression head which are employed can be easily and quickly changed and the water or fluid cushion which is used can be controlled by a valve so that the compressor can be lowered at any position by the use of a valve and should the air be turned off while the table is in elevated position and the water valve left open, the table will not drop with a jar but lowers gradually and yet not too slowly and can be stopped at any time by closing the water valve.

Heretofore it has been customary to employ one or more hand levers for moving the parts and compressing sand in the flask and the slipping or back throw of such levers and striking the operator has at times resulted disastrously. By the use of my invention this defect is entirely overcome. The frame also for the pattern board is very simple and can be replaced by similar frames for different patterns for different molds.

In a general way my invention employs a supporting frame in which are a press and a compression head. Between these parts is a flask having a pattern frame coöperating with its cope and drag and a carriage by which said pattern frame can be moved to one side of said flask. These parts are constructed so that the cope and drag can be easily manipulated during the process of molding.

The parts enumerated are assembled to coöperate in the manner and constructed with details, as will be hereinafter more fully described and set forth in the specification and claims.

Figure 2:
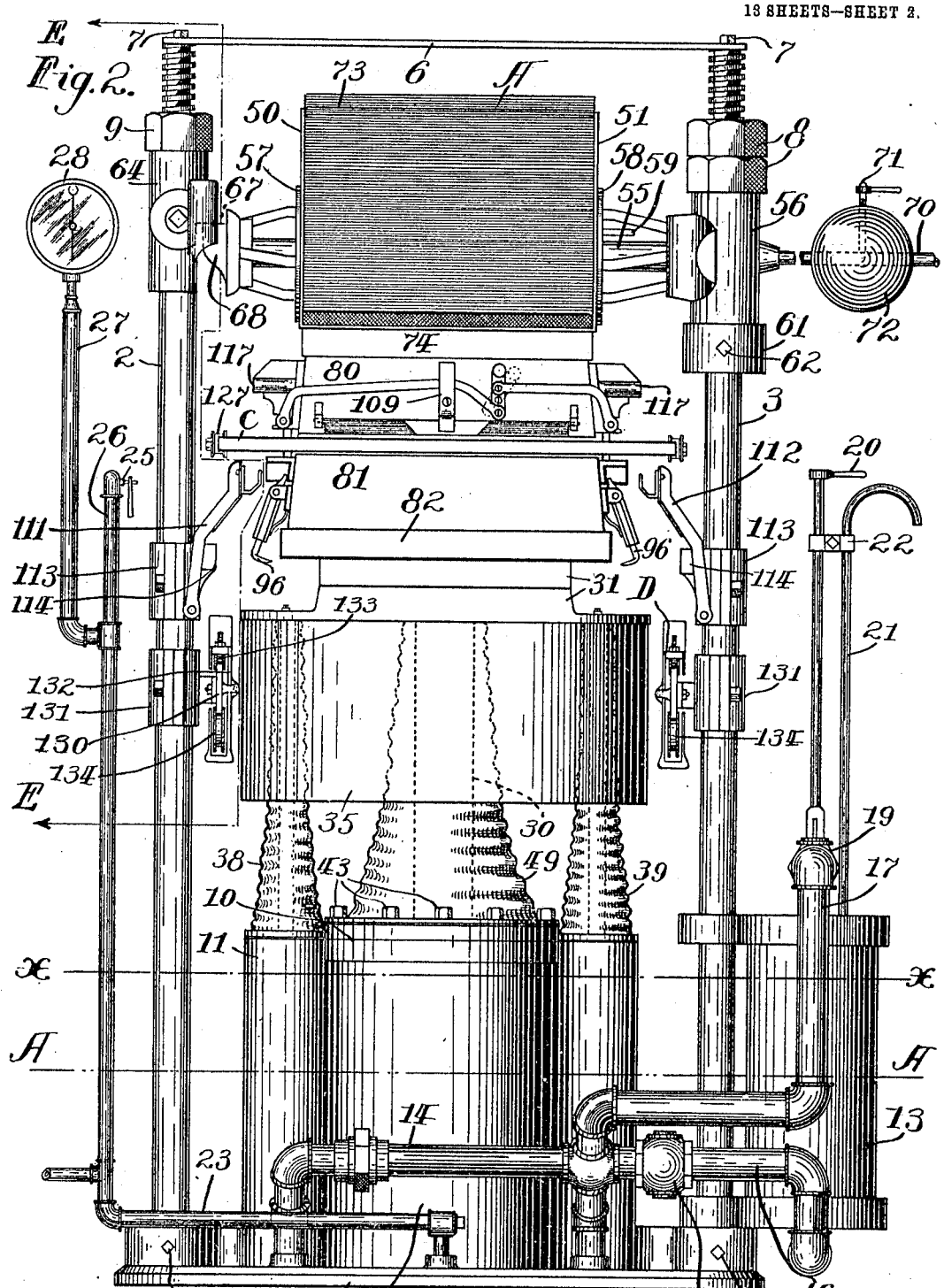
Figure 4:
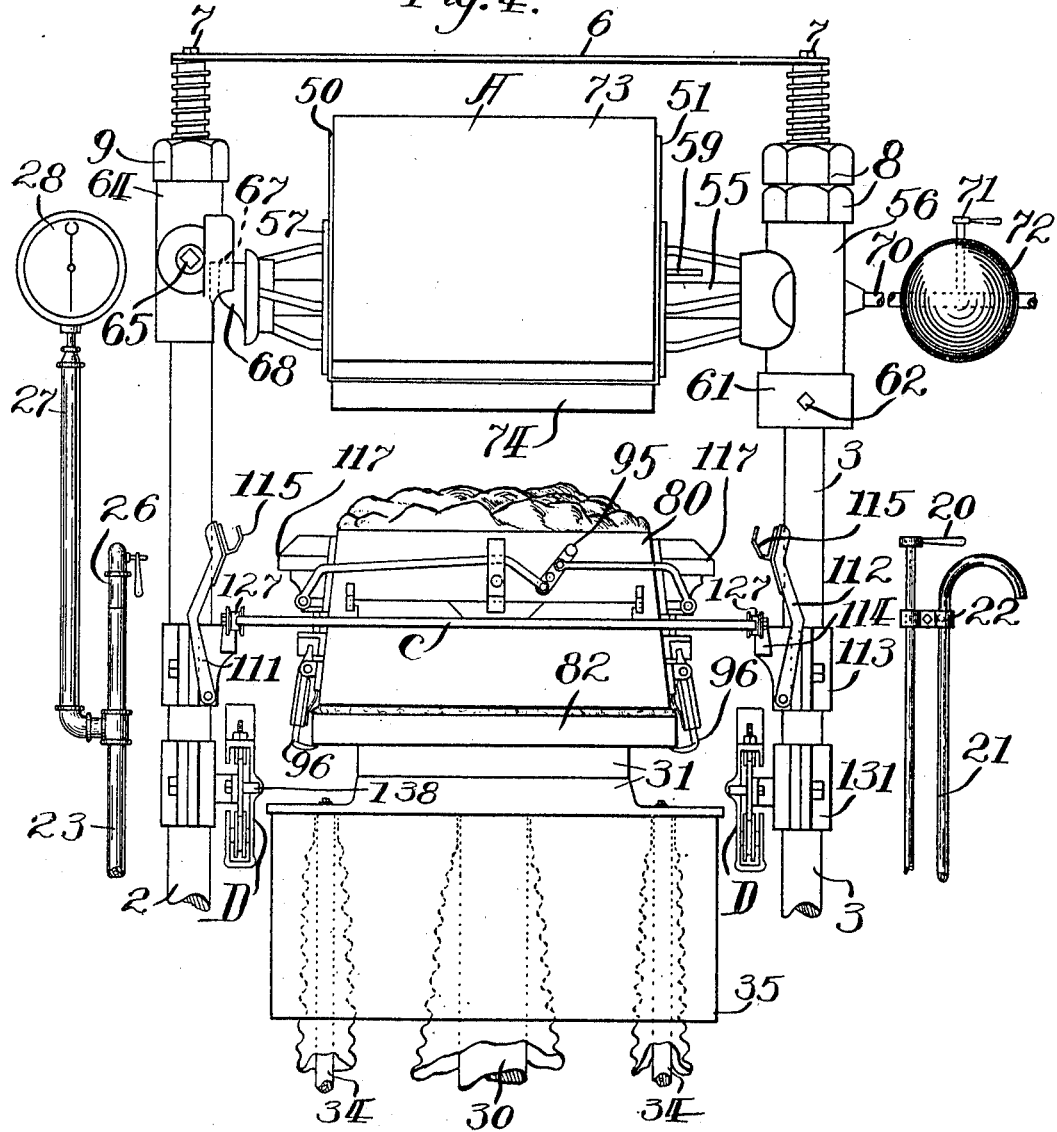
Figure 5:
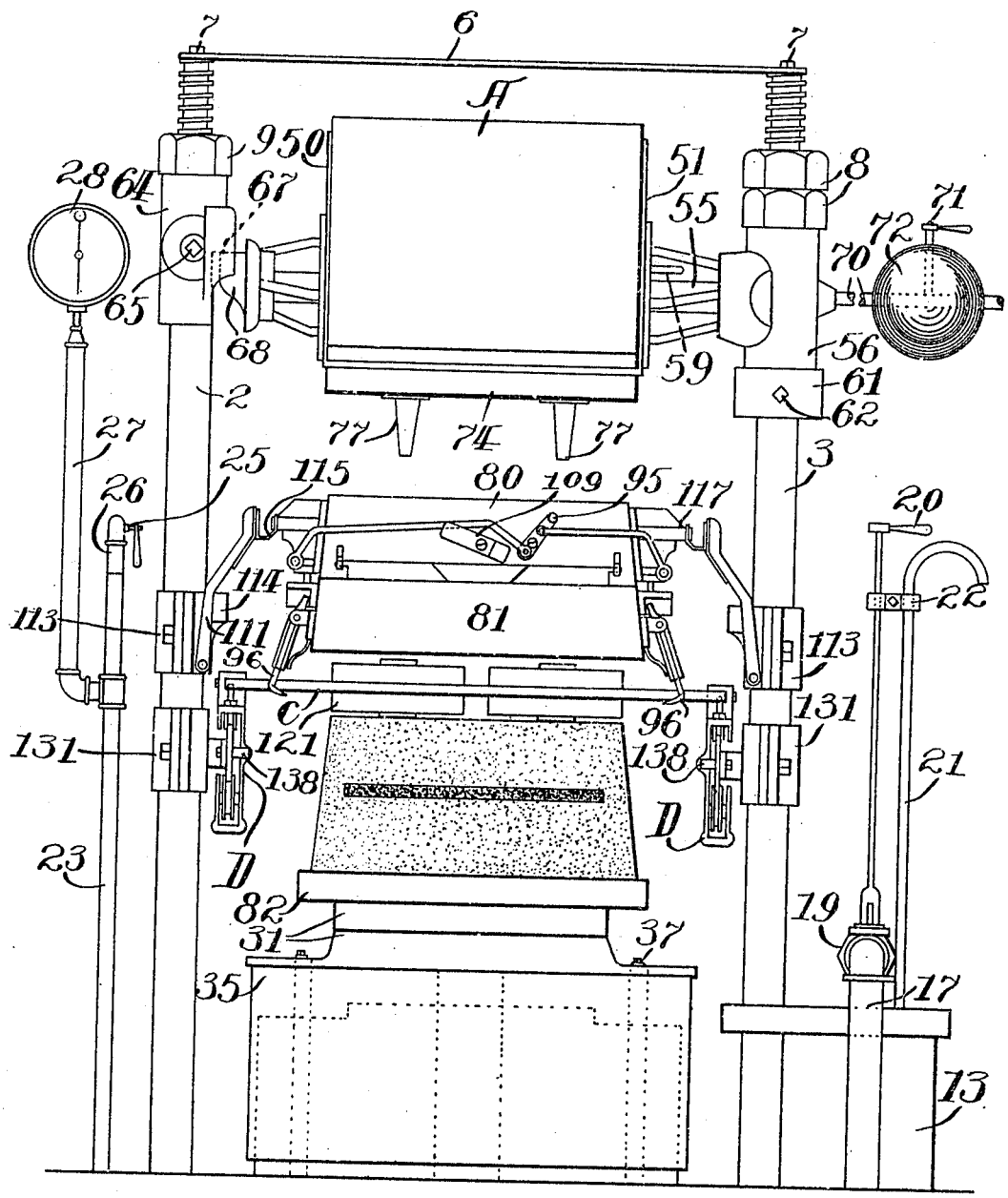
Figure 6:
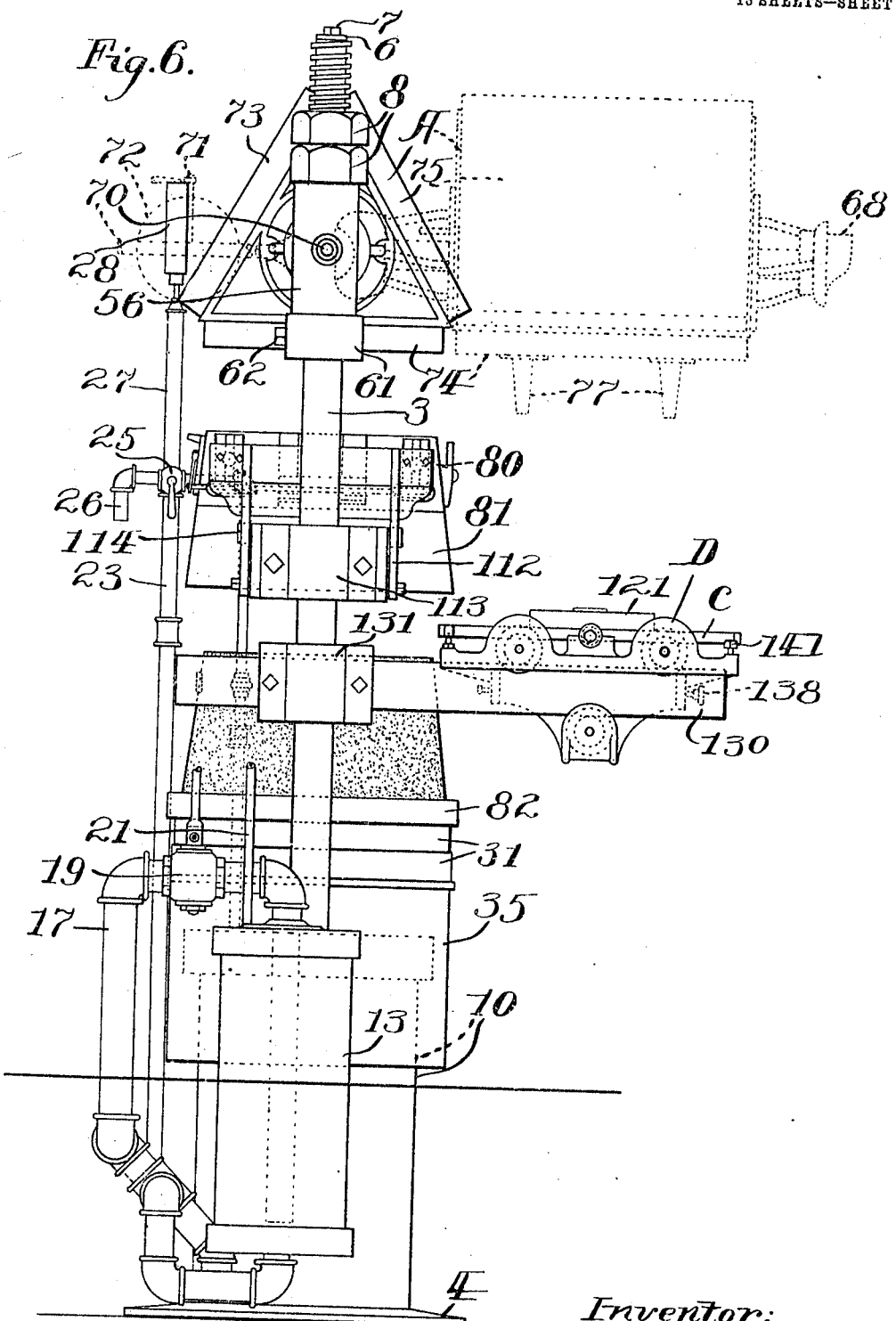
Figure 7:
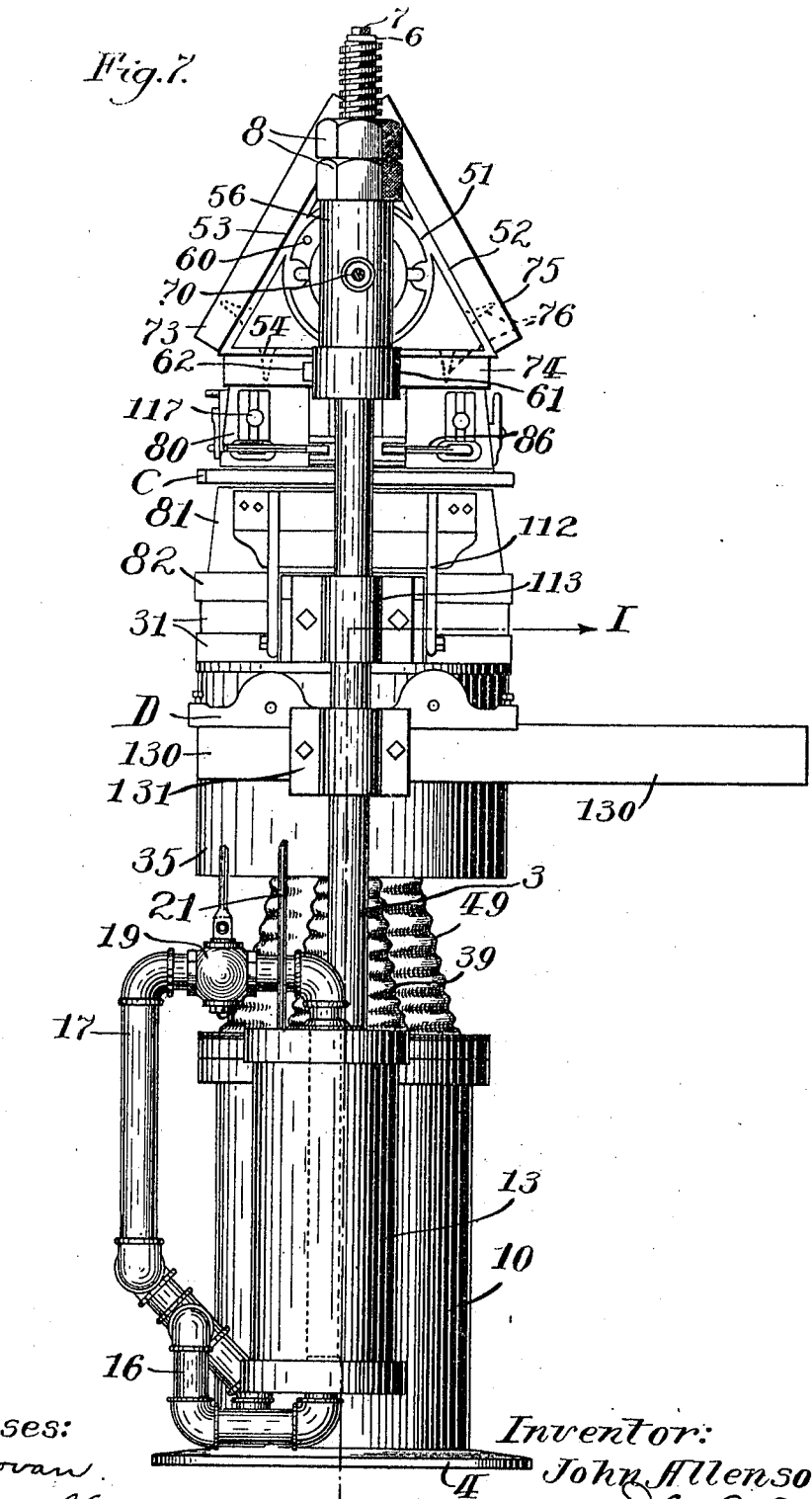
Figure 8:
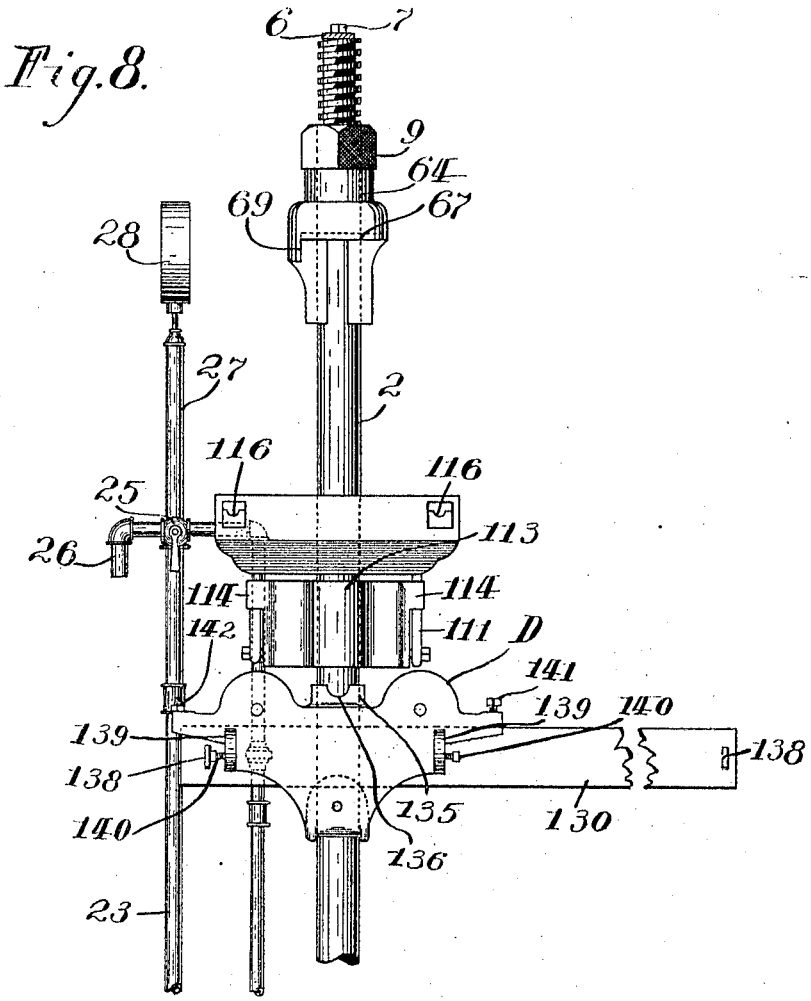
Figure 11:
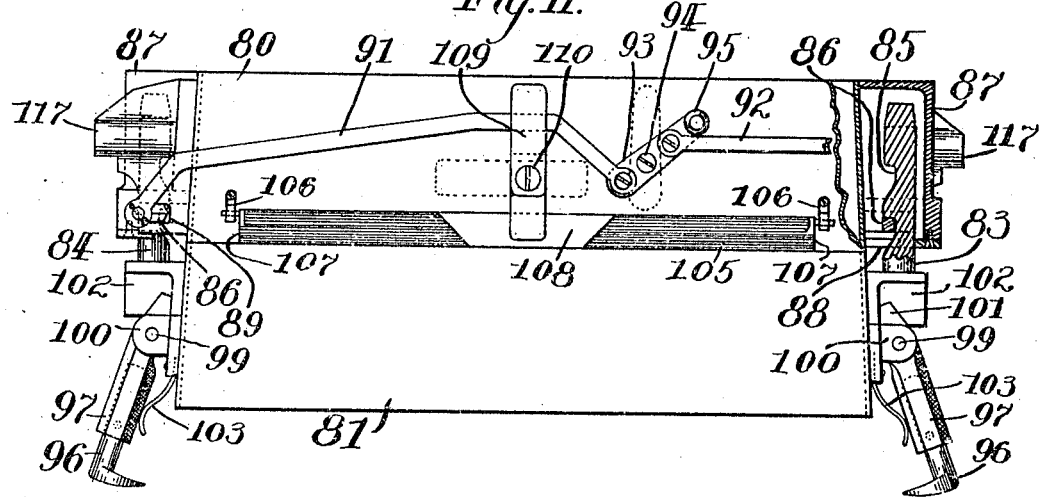
Figure 12:
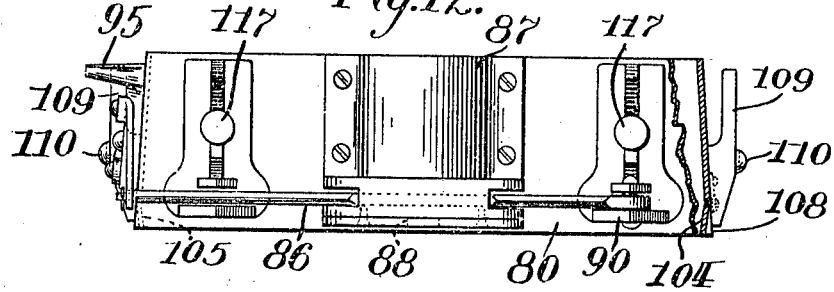
Figure 13:
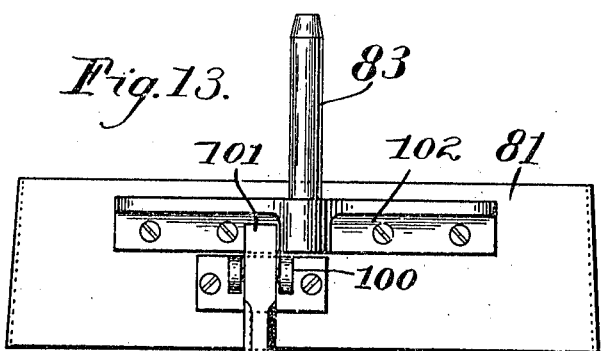

In the accompanying drawings forming part of this specification Figure 1 is a front elevation of the molding machine showing all of the parts in position to begin the operation of making a mold; Fig. 2 is a front elevation of the molding machine showing the position of the cope, pattern board and drag when air is applied, also showing the parts which ordinarily are set below the ground lines A—A; Fig. 3 is a front elevation of the molding machine the lower part thereof being broken away and showing the cope and drag reversed when pressure is applied to the sand in the drag; Fig. 4 is another front elevation of the machine showing the cope and drag reversed to original position a pallet being clamped on the drag, the cope filled with sand ready to be compressed and the lower part of the machine broken away; Fig. 5 is another front elevation of the machine showing the sprues on the compression head, the mold having been withdrawn from the flask and ready to be taken away for pouring; Fig. 6 is a side elevation of Fig. 5 showing how the pattern frame with a pattern, is pushed back out of the way so that the cope and drag can be clamped together and the mold withdrawn. This view also shows in dotted outline, the compression head in the position it assumes when turned back giving free access for removing the mold; Fig. 7 is a side elevation of Fig. 2; Fig. 8 is a side elevation taken on the line E—E of Fig. 2, the lower part of the machine being broken away; Fig. 9 is a plan taken on the line X—X of Fig. 2; Fig. 10 is a sectional elevation taken on the lines I—I of Figs. 7 and 9, the upper part being broken away showing the position of the hood when air is applied to the main cylinder; Fig. 11 is a front elevation of the cope and drag clamped together showing part in section; Fig. 12 is an end elevation of the cope partly in section; Fig. 13 is an end elevation of the drag; Fig. 14 is a plan of the cope partly in section; Fig. 15 is a plan of the drag; Fig. 16 is a plan of one of the pattern plate carriages showing a detail portion of the track on which said carriage rides and illustrating the manner in which the track is secured to one of the vertical shafts of the machine; Fig. 17 is a side elevation of Fig. 16 taken on the line D—D; Fig. 18 is an end elevation of Fig. 16 showing the track in cross-section; Fig. 19 is a plan of the pattern plate frame showing the pattern plate with a pattern attached ready to be placed in the machine; Fig. 20 is an end elevation of Fig. 19, and Fig. 21 is a front elevation of Fig. 19.

*The frame.*—The frame of the machine is composed of two vertical shafts 2 and 3 which are spaced apart and secured at their lower ends in a horizontal base 4 by means of set bolts 5. The upper ends of these shafts are supported by means of a space bar 6 through which bolts 7 pass into the ends of the shafts. The upper ends of the shafts are threaded to support adjusting lock nuts 8 and 9 the purposes of which will be hereinafter set forth.

*The press.*—Integral with the base and between the lower ends of said shafts are three vertical cylinders the main cylinder 10 being centrally disposed and auxiliary cylinders 11 and 12 located on opposite sides of the cylinders between the shafts. The centrally disposed main cylinder is the pneumatic cylinder while the other two of smaller dimensions are hydraulic cylinders for gradually lowering the piston in the air cylinder as will be hereinafter described.

To the lower end of the vertical shaft 3 is secured a cylindrical water or liquid reservoir 13 which is connected to the two hydraulic cylinders 11 and 12 by a system of piping 14 and port passageways 15 in the base for the ingress and egress of water. A branch 16 of the system of piping is connected with the lower end and another branch 17 with the upper end of the reservoir. In the branch 16 is a check valve 18 which allows water to egress freely from the reservoir and prevents said water returning through said branch. In the other branch 17 is a manually operated valve 19 having a vertical handle 20 by which it can be modified to allow water to return into the reservoir. Adjoining the handle 20 is a vertical feed pipe 21 the lower end of which is connected with the upper end of the reservoir and its upper end bent over to form a spout which can be inserted in a pail to draw water from the pail into the reservoir when the machine is in operation as will be hereinafter described. The handle 20 and intake pipe 21 are secured together by means of a brace 22 to steady them in vertical position. The pneumatic cylinder 14 is connected to a suitable source of air pressure not shown by a system of supply piping 23 leading through a port passageway 24 in the base. This air supply system of piping is looped up at one side of the machine and has inserted therein a two way valve 25 an outlet pipe 26 of which opens to the outer atmosphere. The main supply pipe of the system of piping 23 has connected therewith a leg 27 leading to a pressure gage 28 by which a predetermined amount of air pressure can be exerted in the cylinder 10 when desired. By opening the valve 25 air is admitted into the pneumatic cylinder and by reversing it the air supply is closed and the connection with the cylinder opened through the outlet 26.

In the pneumatic cylinder 10 is a piston 29 carrying a vertical piston rod 30. The upper end of said piston rod has secured thereto, a head 31. Auxiliary pistons 32 and 33 work vertically in the hydraulic cylinders 11 and 12 and carry vertically disposed piston rods 34 which are secured at their upper ends to the head 31. The head 31 and coöperating parts form a ram which is adapted to move vertically. The head 31 carries a hood 35 which is substantially oval in shape and adapted to close down over the upper end of the frame of the three cylinders. The hood is employed for protecting the upper ends of the cylinders and the working parts which coöperate therewith, from sand.

The piston rods in the hydraulic cylinders have small passageways 36 running longitudinally through them so that the cylinders can be cleaned said holes being closed at their upper ends by plugs 37 in the head. The hydraulic cylinders have linings 46 made of brass or other suitable material for preventing corrosion. The piston rods of the air and water cylinders are covered by collapsible leather jackets 38, 39 and 49 which protect their movable joints from sand and also serve to keep the sand out of the cylinders. The lower ends of the jackets 38 and 39 are secured to the upper ends of the cylinders 11 and 12 by means of rings and bolts 40 and 41 and the lower end of the jacket 49 is secured at the upper end of the cylinder 10 by means of a ring and bolts 42 and 43. The bolts 43 also serve to secure a stop ring 44 on the upper end of the cylinder 10. The upper ends of all of the jackets are secured upon their respective piston rods by means of tight fitting collars 45.

*The compression head.*—Extending horizontally between the upper ends of the two vertical shafts 2 and 3 is a compression head A which is adapted to rotate upon a horizontal axis said axis being journaled to swing in a horizontal plane above the ram. The compression head is composed of a skeleton frame having triangular ends 50 and 51 and three rectangular sides 52, 53 and 54 thus forming a triangular prism. The ends of this prism are journaled upon a horizontal shaft 55 one end of which is supported upon a sleeve 56. The prism frame is revoluble upon the shaft 55 between two end plates 57 and 58, the former being secured rigidly upon the free end of the shaft 55 and the latter integral with the sleeve 56. The prism can be revolved on the shaft 55 so that any one of the three rectangular sides when below will be horizontal with the base of the machine. When the desired surface of the prism is horizontal with the base, a pin 59 can be inserted into holes 60 in the end plate 58 and end 51 of the prism thus holding the prism rigid on the shaft. The sleeve 56 is supported vertically upon the shaft 3 by means of a collar 61 which is held adjusted in height by means of the set bolt 62. At the upper end of the sleeve 56 is a pair of lock nuts 8 secured upon the threaded end of the shaft 3 and serving to prevent upward movement of the compression head when force is exerted upon it by the ram. A substantially similar back stop arrangement is provided on the shaft 2, a sleeve 64 being adjustably secured thereto, by the set bolt 65 and a lock nut 9 threaded upon the upper end of said shaft. The sleeve 64 is formed with a shoulder 67 below which a lug 68 on the frame of the plate 57 at the free end of the shaft 55 is adapted to pass. It will be apparent how the compression head can be swung from above the ram on the vertical shaft 3 of the machine as illustrated in Fig. 6 in dotted outline. The shoulder piece 67 which is formed on the sleeve 64 has a stop 69 (see Fig. 8) which prevents the free end of the compression head from turning completely around the vertical shaft of the machine to which it is secured and also serves as a gage bringing the compression head into correct position for operation by pulling it around until the free end of the horizontal shaft comes into contact with the stop 69 on the shoulder. The sleeve 56 is provided with an outwardly extending lever 70 in alinement with the shaft 55 upon which is adjustably secured by means of the set bolt 71, a weight 72. This weight serves to counterbalance the compression head so that the sleeve will turn freely upon the shaft 3. The prism frame is adapted to support any design or kind of head plate as desired for the various manipulations of the machine during the process of forming a mold. The head pieces 73, 74 and 75 of suitable construction as illustrated are shown secured to the sides of the prism by means of screws 76. In Fig. 5 the head piece 74 is provided with the usual sprues 77 which are adapted to be used for forming or cutting the pouring gates in the mold.

*The flask.*—Coöperating with the piston head 31 of the ram and the compression head, is a flask B having a cope and drag 80 and 81 which when closed together form a rectangular box resembling a frustum of a pyramid. This flask is adapted to be supported by a pallet 82 which is placed upon the piston head 31 of the ram. During the process of molding, a pattern frame C is adapted to coact with the cope and drag and when not in use, is carried horizontally back of the machine as will be hereinafter more fully described.

The drag has two pins 83 and 84 which are carried by brackets on each end (see Figs. 11 and 13). These pins have ratchet teeth 85 with which the bars 86 on the cope are locked by means of a system of levers clearly illustrated in Figs. 11, 12 and 14. Two ratchet teeth are provided on each pin the tooth near the outer end of the pin being engaged by the lock bar 86 when the pattern board is between the cope and drag and the tooth near the inner end of the pin being engaged by the lock bar when the pattern board is not between the cope and drag as illustrated in Fig. 11. Each end of the cope is formed with a housing 87 having an opening 88 to admit the pin. The lock bar 86 passes transversely through the housing and is adapted to work in a slot 89. The lock bars are similar in construction each being pivoted at one end in a bracket 90. The outer ends of the lock bars are pivotally connected by a pair of shifting rods 91 and 92. A lever 93 pivoted at 94 between its ends on one side of the cope and provided with a handle 95 is connected to the shift rods 91 and 92 so that the lock bars 86 can be withdrawn from the pins 83 and 84 or engaged with their teeth. The drag is provided with a pair of hooks 96 which are employed for holding the pallet 82 (see Fig. 4) upon the bottom of the drag to keep the sand therein when it is turned over to fill the cope. The hooks 96 have their shanks adjustably secured in socket pieces 97 by means of set bolts 98. The socket pieces are pivoted at 99 upon brackets 100 on the sides of the drag and their inner ends 101 are adapted to impinge against the sides of the pin brackets 102 to limit the outward throw of the hooks. Springs 103 secured to the sides of the drag press the socket pieces out free from the pallet. The hooks are adapted to be thrown into engagement with the pallet by hand and are so adjusted to their socket pieces as to form a tight connection with the pallet. Ordinarily the inner walls of the flask have sufficient friction to prevent the sand from falling out of the cope when the pattern is drawn from the sand in the drag. However, when desired, auxiliary mechanism may be provided as illustrated in the drawings. This mechanism consists of a pair of retaining slats 104 and 105 at the sides near the lower edges of the cope. These slats are pivoted in brackets 106 and are adapted to swing into the position as illustrated in Fig. 12 through apertures 107 in the lower side edges of the cope. The outside of each retaining slat is offset to form a guide 108 which declines outwardly from the surface of the slat. With this guide a dog 109 pivoted at 110 on each side of the flask coöperates. When this dog is in the full line position illustrated in Fig. 11, the slat with which it coöperates is held declining inwardly in the flask as illustrated in Fig. 12 and when the dog is turned upon its pivot into the broken line position illustrated in Fig. 11, the slat is allowed to swing out. When the slats are in inner position, the sand is held in the cope without danger of falling out and when in outer position the mold is free to be drawn from the flask.

*The cope supports.*—Secured to the two vertical shafts 2 and 3, a little below the compression head, are two hinged supports 111 and 112. These supports are for the purpose of holding the cope in horizontal and superior position as illustrated in Fig. 1. The supports are pivoted upon collars 113 on both vertical shafts so that they can be swung away from each other toward the sides of the machine and out of the vertical path of the flask. The collars 113 are formed with stops 114 against which the supports 111 and 112 impinge when in innermost position. The supports are formed with brackets 115 which are notched at 116 (Fig. 8) to engage below studs 117 on the ends of the cope thus supporting the cope in horizontal position as illustrated in Fig. 1.

*The pattern frame.*—The pattern frame C is rectangular in shape and apertured to receive a pattern plate 120 bearing the pattern 121 from which the mold is to be formed. The pattern plate is removably held in the pattern frame by means of cleats and screws 122 and 123. The pattern frame is formed with centrally disposed trunnions 124 upon its ends having webs 125 through which vertical openings 126 pass to admit the pins 83 and 84 of the drag when the pattern frame is placed between the cope and drag. Upon the ends of the trunnions 124 are journaled antifriction wheels 127. A pair of lateral stops 128 are formed at the ends of one side of the pattern frame which are for the purpose to be hereinafter described.

*The pattern frame carriage.*—Extending back from the machine in a horizontal plane is a pair of track bars 130 said bars being supported upon collars 131 which are clamped upon the vertical shafts 2 and 3. The track bars are spaced sufficiently apart below the supports 111 and 112 so that the piston head of the ram and the flask can play freely up and down between them. Upon each track bar rides a carriage D each carriage consisting of a carriage frame 132 carrying a pair of supporting wheels 133. Coöperating below the track bar and journaled upon the carriage frame is a guide wheel 134 which prevents the carriage running off of its track. Each carriage carries a centrally disposed upwardly extending support 135 in which is a seat 136. The seats 136 in both carriages are adapted to receive the antifriction wheels 127 on the pattern frame, said wheels 127 permitting the pattern frame to turn vertically. When it is desired to move the pattern frame away from the flask, it is lowered into the seats 136 and said frame with the carriages is moved back upon the track bars 130. Stops 138 are formed on each end of each track bar and each carriage is provided with flanges 139 carrying adjustable stop bolts 140 which are adapted to impinge against the stops 138 to limit the forward and backward movement of the carriage and the pattern frame which the carriages support. The stops 128 on the pattern frame are adapted to impinge upon forward and backward stop bolts 141 and 142 which are threaded into the carriage frames. The stops 128 and stop bolts 141 and 142 allow the pattern frame to be turned into horizontal position with either side of the pattern plate 120 turned up. The projecting lugs 143 which are formed on the corners of the pattern frame opposite the stops 128, serve as handles for turning the pattern frame upon the trunnion wheels 127 when the latter are seated on the carriages.

Operation: In operation the parts are assembled in relative position as illustrated in Fig. 1. The valve 25 is opened to admit air into the pneumatic cylinder 10 and the piston head 31 forced up to the pattern plate, the pins on the ends of the drag passing through the corresponding holes 126 in the pattern plate frame. The pattern plate is thus carried up to the cope the pins 83 and 84 passing into the housing frames 87 and forcing the cope against the compression head A. This presses the cope, pattern plate and drag together as shown in Fig. 2 and they are then locked together (see Fig. 11) by the shift bars and handle lever 95 on the cope. The parts are then lowered by closing the valve 25 and opening the valve 19 thus allowing fluid to escape from hydraulic cylinders 11 and 12 into the reservoir 13. As the parts lower the pattern plate is caught upon the carriages which have been moved into forward position against the stops 138, the trunnion wheels 137 receding into the seats 136. The parts of the flask together with the pattern frame locked between the cope and drag are then turned over into the position illustrated in Fig. 3 the piston head having receded sufficiently to allow this movement of the parts. The cope is then at the bottom and the drag on top. The drag is next filled with sand and compressed as shown in Fig. 3 by opening the pneumatic valve 25. The parts are again lowered by opening the hydraulic valve and more sand put into the drag and after being leveled to the upper edge of the drag, the pallet 82 is clamped on the drag by means of the hooks 96 as illustrated in Fig. 4 to hold the sand therein. The parts are then again lowered to the pattern plate carriage and turned back to original position so that the cope is on top. Sand is then filled into the cope (see Fig. 4) and the flask forced up against the compression head and lowered in the usual manner. More sand is put into the cope and again compressed (see Fig. 2), it being obvious that different compression heads can be used by turning the compression head on the horizontal shaft as described. The cope, pattern plate and drag are again lowered and the compression head turned so that the sprues 77 are in position to cut or mold sprue holes in the sand to form pouring gates. The cope supports are then thrown forward and the cope, pattern plate and drag are carefully locked and lowered so that the cope will hang on said supports. The pattern plate is left on the carriages and the drag going on down, left on the piston head as illustrated in Fig. 1. The pattern plate frame is then pushed back on the carriages as shown in Fig. 6 out of the way and the drag forced up against the cope and locked with it as illustrated in Fig. 11. The retaining slats 104 on the sides of the cope are then released and allowed to swing free. The cope and drag are then lowered, the cope being caught by the cope supports which are adapted to hold the cope in superior position while the piston head 31 lowers under them. The mold thus slides freely out of the flask leaving the flask hung on the cope supports as illustrated in Figs. 5 and 6. The mold is then ready to be carried away on the pallet and by the same method another mold is made.

During the operation above described, the compression head can be swung back from normal position and the prism frame turned so that any compression head desired is brought into play. By using compressed air and the apparatus above described, a constant and predetermined force can be exerted by the ram upon the sand in the flask thus enabling the operator to make a number of molds having the sand compressed the same in all. The gage 28 serves as an indicator to tell what pressure is being exerted by the ram upon the sand in the flask. When the piston head rises under the force of compressed air, the pistons or plungers 32 and 33 suck the water or fluid from the reservoir into the cylinders 11 and 12 and the check valve 18 prevents the return of the fluid into the reservoir until the hand operated valve 19 is opened whereupon the fluid returns into the reservoir slowly and the piston head lowers gradually. This construction overcomes the objection of vibration of the parts and produces a substantially perfect mold for casting.

It will be understood from the above description that the compression head, pattern frame carriage, and cope supports can be varied in height by changing the positions of the sleeves of said parts upon the vertical shafts and in this manner the machine can be set so that a flask of any desired height can be employed.

In accordance with the patent statutes I have described the principles of operation of my invention together with apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:

1. A molding machine of the class set forth, comprising, in combination, a frame, an overhead compression head, a carrier journaled to swing horizontally on said frame and upon which said head is journaled to revolve vertically, a flask, a piston head below the flask, and a cylinder connected with a source of air pressure supply and coöperating with said piston, for the purposes specified.

2. A molding machine of the class set forth, comprising, in combination, a frame, an overhead compression head, a carrier journaled to swing in a horizontal plane on said frame and upon which said head is journaled to revolve in a vertical plane, a piston head adapted to move vertically and coöperate with said flask and compression head, a cylinder connected with a source of pressure and coöperating with said piston head, a flask between said compression head and piston head and means for determining the pressure exerted by said piston head.

3. A molding machine of the class set forth, comprising, in combination, a frame, a compression head, a flask below said compression head having a cope and drag, a pattern plate between said cope and drag, means for separating said cope and drag, means for carrying said pattern plate laterally from said flask, a ram below said flask having a head and piston, a cylinder coöperating with said piston and connected with a suitable source of pressure for raising said head, a plunger connected with said head, an auxiliary cylinder in which said plunger is adapted to oscillate, a fluid reservoir connected with said auxiliary cylinder by a valved passageway and a valved branch passageway connected with said auxiliary cylinder and the upper portion of said reservoir adapted by the opening of its valve to allow fluid to escape from said auxiliary cylinder and modify the position of said piston head.

4. A molding machine of the class set forth, comprising, in combination, a frame, a compression head, a flask below said compression head having a cope and drag, means for separating said cope and drag, a pattern plate between said cope and drag, means for moving said pattern plate laterally, a ram below said flask having a head and piston, a hood depending from said head, a pneumatic cylinder in which said piston is adapted to oscillate, an air supply pipe leading into said cylinder having an exhaust branch, a valve in said pipe at the junction of said branch adapted when open to admit air into said cylinder and when closed to permit air from the cylinder escaping through said branch, a plunger connected with said head, an auxiliary cylinder in which said plunger is adapted to oscillate, a fluid reservoir having a feed connection with said auxiliary cylinder, a check valve in said connection for preventing the return of fluid through said connection into said reservoir, a branch passageway leading from said connection to the upper portion of said reservoir, and a manually operated valve in said branch permitting the egress of fluid from said auxiliary cylinder into the reservoir when opened.

5. A molding machine of the class set forth, comprising, in combination, a frame, a compression head having a prism journaled upon said frame to revolve in a vertical plane and to turn in a horizontal plane, head plates carried by the sides of said prism, a ram adapted to coact with said compression head, a flask between said compression head and ram having a cope and drag, a pattern plate adapted to coact with said flask between said cope and drag and means for separating said cope and drag and removing said pattern plate from the flask.

6. A molding machine of the class set forth, comprising, in combination, a frame having a pair of vertical shafts spaced apart, a horizontal shaft swung from one of the vertical shafts, a compression head journaled upon said horizontal shaft, a back stop mounted upon one of the vertical shafts with which the free end of the horizontal shaft is adapted to coincide to support the compression head against upward force, a ram directly below said compression head when said horizontal shaft coincides with said back stop, a source of pressure connected with said ram to propel it toward said compression head, a flask between said compression head and ram having a cope and ram, a pattern plate adapted to coact with said flask, means for separating said cope and drag, and means for removing said pattern plate from said flask.

7. A molding machine of the class set forth, comprising, in combination, a frame having a pair of vertical shafts spaced apart, a horizontal shaft swung from one of said vertical shafts, a compression head having a prism journaled upon said horizontal shaft, a head plate secured to each side of said prism, a back stop on one of said vertical shafts with which the free end of said horizontal shaft coincides to block the compression head against the force of the ram, means for locking the prism with any one of the head plates on the lower side of said prism in horizontal position, a weight connected with the journal of the horizontal shaft to counterbalance the compression head, a ram in said frame adapted to coact with the compression head, a flask between said ram and compression head having a cope and drag, a pattern plate adapted to coact with said flask between said cope and drag, means for separating said cope and drag and means for removing the pattern plate from the flask.

8. In a molding machine, a supporting frame, a ram in said frame, a compression head, a flask between said ram and compression head having a cope and drag, a pattern plate coacting with said cope and drag, a pattern plate frame apertured to receive the pattern plate and marginal cleats fastened to said pattern frame and holding the pattern plate in said aperture.

9. In a molding machine, an inclosing frame, a ram in said frame, a compression head, a flask between said ram and compression head, a pattern plate coacting with said flask, a pattern plate frame apertured to receive said pattern plate, means for detachably holding said pattern plate in said pattern plate frame, a pair of carriages and transverse tracks upon which said carriages are adapted to run, said pattern plate frame being formed with a pair of trunnions to rest upon said carriages and cause the pattern frame to lie in a horizontal plane when either side of the pattern plate is turned up.

10. In a molding machine, a supporting frame, a ram in said frame, a compression head, a flask having a cope and drag between said compression head and ram, a pin and socket connection between the cope and drag of said flask, a pattern plate adapted to be placed between said cope and drag, an apertured frame to receive the pattern plate having a pair of oppositely disposed trunnions, a pair of transverse track bars and carriages upon said track bars adapted to receive the wheels of the trunnions and carry the pattern frame from the flask, the stop of said pattern frame being adapted to impinge against one of the carriages and cause the pattern plate in its frame to lie in a horizontal plane when either side of the pattern plate is turned up.

11. In a molding machine, a supporting frame, a ram in said frame, a compression head, a flask having a cope and drag between said compression head and ram, a pattern plate adapted to be placed between said cope and drag, an apertured frame to receive said pattern plate having a pair of oppositely disposed trunnions, a pair of horizontal track bars on the supporting frame, carriages riding upon said track bars having frames with seats to admit the trunnions of the pattern frame and stops upon said track bars limiting the forward and backward movement of said carriages.

12. In a molding machine, a supporting frame, a ram, in said frame, a compression head above the ram, a flask having a cope and drag between said compression head and ram, a pattern plate adapted to be placed between said cope and drag, an apertured frame to receive and support the pattern plate having a pair of oppositely disposed trunnions, a pair of horizontal track bars supported upon the frame of the machine in parallel position, carriages riding upon said track bars having frames with seats to admit the trunnions of the pattern frame, stops upon the track bars limiting the forward and backward movement of the carriages and detachable stop bolts upon the carriages adapted to impinge against the stops on said track bars and by their adjustment to vary the range of movement of the carriages.

13. In a molding machine, a supporting frame, a ram in said frame, a compression head above said ram, a flask between said ram and compression head having a cope and drag, connecting pins and sockets between said cope and drag, a pattern plate between said cope and drag, an apertured frame to receive and support said pattern plate having trunnions with openings passing through them to receive the connecting pins of the flask, a pair of track bars adjustably supported vertically upon the frame of the machine parallel to each other and spaced apart to permit the piston head of the ram to play freely up and down between them, carriages riding upon said track bars having frames with seats to admit the trunnions of the pattern frame, and stops upon said track bars limiting the forward and backward movement of said carriages.

14. In a molding machine, a supporting frame, a ram in said frame, a compression head above said ram, a flask between said ram and compression head having a cope and drag, said cope being formed with supporting lugs on its outer walls, a pattern plate adapted to be placed between said cope and drag, means for removing said pattern plate from between said cope and drag, and a pair of cope supports hinged to said supporting frame and having seats which are adapted to receive said supporting lugs on the cope when said cope supports are swung into the path thereof, whereby the cope can be held in superior position when the ram lowers and the pattern board removed from the flask.

15. In a molding machine, a supporting frame, a ram in said frame, a compression head above said ram, a flask between said ram and compression head having a cope and drag, said cope being formed with supporting lugs on its outer walls, a pattern plate adapted to be placed between said cope and drag, means for locking said cope and drag together with said pattern plate between them and a pair of cope supports in the path below the supporting frame and adapted to swing back out of the path of the supporting lugs on said cope.

16. In a molding machine, a frame having a pair of vertical shafts, a ram in said frame, a compression head supported above said ram upon said shafts, a flask between said ram and compression head having a cope and drag, a pattern plate adapted to be placed between said cope and drag, studs on the ends of the cope adjacent to said shafts, a pair of sleeves adjustably mounted upon said shafts having stops and cope supports adapted to swing in the path below the studs on said cope, said supports being hinged to said sleeves and adapted to play against said stops, whereby said supports can be held in the path of the studs on the cope to support the cope in horizontal position or turned back out of their path, for the purposes specified.

17. In a molding machine, a frame having a pair of vertical shafts spaced apart, a ram in said frame, a compression head above said ram, a flask having a cope and drag between said ram and compression head, a pattern plate between said cope and drag, a pattern frame supporting said pattern plate and a pair of cope supports pivotally journaled, to swing into the path of the cope to support the latter in horizontal position or to swing out of the path of the cope and a plurality of collars adjustably secured to said shafts upon which said compression head and cope supports are mounted so that they can be varied in vertical position to coöperate with flasks of different vertical dimensions.

18. In a molding machine, a supporting frame having a pair of vertical shafts spaced apart, a ram in said frame, a compression head above said ram, a flask between said ram and compression head having a cope and drag, a pattern plate adapted to be placed between said cope and drag, a pattern plate frame, a pair of horizontal track bars, carriages running upon said track bars and adapted to receive and move the pattern plate frame with the pattern plate from the flask and a plurality of collars movably secured to the vertical shafts upon which the compression head and track bars are mounted, whereby flasks of different vertical dimensions can be handled between said ram and compression head.

In testimony whereof, I have signed my name to this specification, in the presence of two subscribing witnesses.

JOHN ALLENSON.

Witnesses:
H. L. FISCHER,
F. G. BRADBURY.